Aug. 20, 1957 L. A. PETERMANN 2,803,128
METHOD AND APPARATUS FOR ASCERTAINING
ULTRASONIC BEAM PATTERNS
Filed Dec. 31, 1952 4 Sheets-Sheet 1
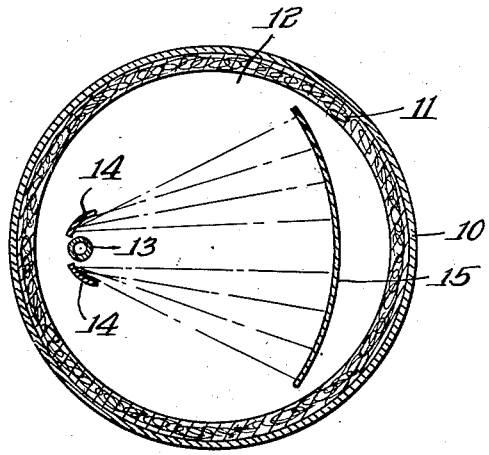
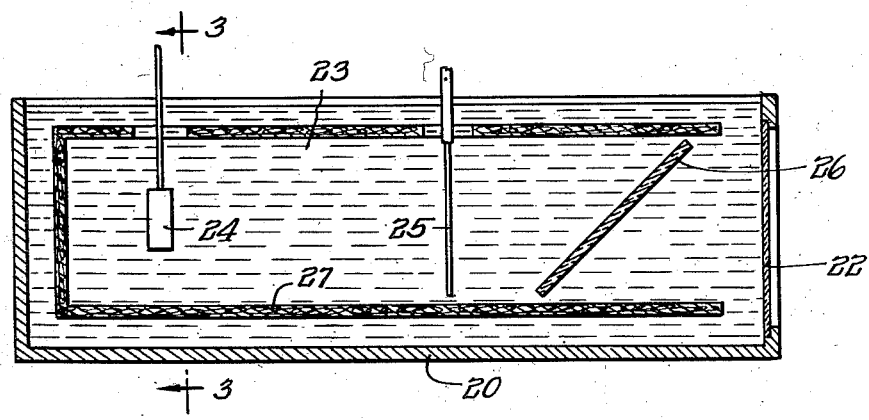
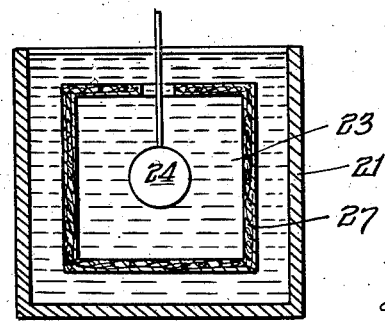
INVENTOR.
Lucien A. Petermann
BY
Wallenstein & Spangenberg
Attys.

INVENTOR.
Lucien A. Petermann
BY Wallenstein & Spangenberg
Attys.

INVENTOR.
Lucien A. Petermann
BY
Wallenstein & Spangenberg
attys

Aug. 20, 1957 — L. A. PETERMANN — 2,803,128
METHOD AND APPARATUS FOR ASCERTAINING
ULTRASONIC BEAM PATTERNS
Filed Dec. 31, 1952 — 4 Sheets-Sheet 4

INVENTOR.
Lucien A. Petermann
BY Wallenstein & Spangenberg
Attys.

2,803,128
Patented Aug. 20, 1957

2,803,128

METHOD AND APPARATUS FOR ASCERTAINING ULTRASONIC BEAM PATTERNS

Lucien Alfred Petermann, Metuchen, N. J., assignor to Gulton Industries, Inc., a corporation of New Jersey Application December 31, 1952, Serial No. 328,859

15 Claims. (Cl. 73—67.6)

The principal object of this invention is to provide an improved method and apparatus for ascertaining and/or recording ultrasonic beam patterns.

Briefly, the method of this invention contemplates immersing an ultrasonic transmitter in a liquid, and exciting a phosphorescent screen and immersing it in the liquid at a desired position with respect to the ultrasonic transmitter. The immersed ultrasonic transmitter is energized and the immersed excited phosphorescent screen is subjected, in the absence of exciting energy and for a time interval, to the ultrasonic beam transmitted through the liquid by the ultrasonic transmitter. The decay with respect to time of the phosphorescence of the screen is modified by the transmitted beam to form a pattern thereon in accordance with the pattern of the transmitted beam. This pattern so produced on the phosphorescent screen may be inspected to ascertain the ultrasonic beam pattern. The phosphorescent screen may also be removed from the liquid and applied to a photographic emulsion for photographically reproducing the beam pattern thereon for permanent record purposes.

The liquid in which the ultrasonic transmitter and the phosphorescent screen are immersed may be held in a suitable container and absorbing material is preferably located in the container adjacent the sides thereof for absorbing waves produced by the ultrasonic transmitter and not directly transmitted to the screen. This prevents interference from stray waves and the formation of standing waves which would interfere with the reproduction of the beam pattern. The beam pattern on the phosphorescent screen may be inspected by removing the screen from the liquid in the container or it may be inspected while in the container. In this latter respect the container may be provided with a transparent end wall and a transparent baffle through which the screen may be inspected. The baffle directs waves passing through and around the screen into an absorber so as not to be reflected onto the screen and so as not to form standing waves. Here the phosphorescent screen is made sufficiently thin so that the pattern produced thereon extends through the screen to be visible from the back side thereof.

The phosphorescent screen includes phosphorescent microcrystalline materials of long decay period phosphors. These phosphors are characterized by the existence of metastable energy levels for the electrons in the crystal structure, often referred to as electron traps. The distribution of these electron traps gives the decay law of light intensity and temperature sensitivity. After these phosphors have been excited, such as by a strong tungsten or ultraviolet lamp or the like, and are then subjected to an ultrasonic beam or waves, the heat produced by the absorption of ultrasonic energy, and the mechanical agitation itself, modify the decay of phosphorescence with respect to time. After the ultrasonic irradiation the light intensity pattern on the phosphorescent material gives an actual image of the ultrasonic intensity pattern, where the darker regions are those where the ultrasonic intensity is higher.

The principal kinds of these phosphorescent microcrystalline materials are found among the alkaline earth halides, alkaline rare-earth sulfides, ZnS, CdS, CaS, SrS and the like, and all the phosphors related to solid solutions of these sulfides or halides. The activators used, sometimes referred to as impurities, are very numerous among which the most important are Mn, Cu, Ag, Bi, Rh, Y and Tb at various concentrations. Another class of phosphors is formed by the silicates, orthosilicates, mesodisilicates and chlorophosphates of Zn, Be, Ce and K. A further class of phosphors is found among the electroluminescent materials whose phosphorescence is excited by an electric field. Experiments show that exceptional results are obtained with a solid solution of SrS and CaS activated by Rh, Tb and Y. These various phosphors are all well known in the art and further discussion thereof is not considered necessary.

The phosphorescent microcrystalline material is mixed with a suitable carrier such as a synthetic plastic or the like, for example, nitrocellulose or cellulose acetate, to form the phosphorescent screen. Where the pattern produced on the phosphorescent screen is to be viewed from the rear, the phosphorescent screen must be very thin, for example, 0.12 mm. thick or the like. The thin phosphorescent plastic screen may be made in various ways, as for example, by spreading a mixture of the phosphorescent microcrystalline material and the synthetic plastic with a suitable solvent into a thin sheet and then drying the same to drive off the solvent.

The ultrasonic transmitter and the phosphorescent screen are immersed in a liquid because the ultrasonic beams or waves are transmitted with greater efficiency through the liquid than through a gas such as air. Any appropriate liquid may be utilized for transmission purposes, kerosene being particularly beneficial.

This invention is adaptable for many uses, such as, testing an ultrasonic transmitter as to its beam pattern, testing solid and opaque objects as to their internal structures, flaws, defects and the like, testing such solid and opaque objects in depth, testing for sound propagation in hollow miniature models, and the like. The adaptations of this invention for these purposes also form objects of this invention.

In testing ultrasonic transmitters as to their beam patterns, the ultrasonic beams are preferably transmitted directly through the liquid onto the fluorescent screen. Any type of ultrasonic transmitter may be so tested including those having various shapes and various beam concentrating or spreading devices and reflectors and their beam patterns are accurately and readily depicted.

In testing solid and opaque objects as to their internal structures, flaws, defects and the like, the object to be tested is immersed in the liquid between the ultrasonic transmitter and the fluorescent screen in the path of the ultrasonic beam. If the ultrasonic beam has been locally modified by the internal structure, flaw or defect of the object being tested as it passes therethrough, this appears on the phosphorescent screen as a spot or area of different brightness compared to the surroundings. In this way the internal structure, flaw, defect or the like in the object being tested is accurately and simply depicted on the fluorescent screen.

An ultrasonic lens may be immersed in the liquid between the object to be tested and the phosphorescent screen in the path of the ultrasonic beam for focusing the image of the internal structure, flaw or defect of the object being tested on the fluorescent screen. The object being tested, the ultrasonic lens or the fluorescent screen may be relatively positioned to focus the image of a selected depth of the object being tested on the fluorescent screen. In this way, the internal structure, flaw or defect at any selected depth in the object being tested may be ascertained. By making graduated focusing adjustments the object may be tested at various points throughout its depth to obtain three dimensional determinations of the object's internal structure, flaws, defects and the like.

Where an ultrasonic lens is utilized, the ultrasonic beam must traverse both the object being tested and the ultrasonic lens and also the liquid therebetween, which is not conducive of maximum efficiency. If the surface of the object being tested is flat, it may be fixed tight to a thick or elongated metal ultrasonic lens. Thus, the ultrasonic beam passes directly from the object being tested to the ultrasonic lens, making the transmission of power from the ultrasonic transmitter to the fluorescent screen more efficient. This thick or elongated ultrasonic lens may be made from a block of aluminum or the like. Of course the thick ultrasonic lens must be as free as possible from all internal defects or flaws for such would be depicted on the fluorescent screen.

In testing for sound propagation in hollow miniature models and the like, the inner surfaces of the model are coated with a phosphorescent material. Here, the microcrystalline phosphorescent material may be mixed in a suitable carrier having a solvent and applied to the inner surfaces and then dried to drive off the solvent. In this way the inner surfaces of the model are in effect provided with a phosphorescent screen. This phosphorescent coating is then excited and the model is immersed in a liquid with the liquid completely filling the same. An ultrasonic transmitter is immersed in the liquid at a desired position within the model. When the ultrasonic transmitter is energized a pattern is produced on the fluorescent coating of the model in accordance with the propagation of the ultrasonic beam and hence in accordance with sound propagation in the model. In so testing the miniature model actual sound conditions at the walls or surfaces in a full scale counterpart of the model may be accurately predetermined.

To determine sound propagation in space within a miniature model and hence in its full size counterpart, a thin phosphorescent screen, which is substantially transparent to ultrasonic beams or waves, is immersed in the liquid at desired positions within the miniature model and is subjected to the ultrasonic beam transmitter through the liquid by the ultrasonic transmitter. The pattern produced on the phosphorescent screen corresponds to the propagation of the ultrasonic beam in space and hence to the sound propagation expected in the full sized counterpart of the model.

To increase the efficiency of the transmission of the ultrasonic beams in the various forms of the invention described above the ultrasonic transmitter, the object being tested and the ultrasonic lenses may be provided with suitable matching devices, layers of suitable materials of suitable thicknesses, for increasing the coupling efficiency.

Further objects of this invention reside in the various steps of the testing methods of the various forms of the invention and in the cooperative relationships therebetween and also in the details of construction of the apparatuses and the cooperative relationships between the component parts thereof.

Other objects and advantages of this invention will become apparent to those skilled in the art upon reference to the accompanying specification, claims and drawings in which:

Figure 1 is a horizontal sectional view through one form of an apparatus for testing an ultrasonic transmitter as to its beam pattern;

Figure 2 is a vertical sectional view through another form of an apparatus for testing an ultrasonic transmitter as to its beam pattern;

Figure 3 is a vertical sectional view taken substantially along the line 3—3 of Figure 2;

Figure 4 is a vertical sectional view through an apparatus for testing solid and opaque objects as to their internal structures, flaws, defects and the like;

Figure 6 is a vertical sectional view of another form of an apparatus for testing solid and opaque objects as to their internal structures, flaws, defects and the like;

Figure 7 is a vertical sectional view through an apparatus for testing solid and opaque objects in depth as to their internal structures, flaws, defects and the like;

Figure 8 is a vertical sectional view through another form of an apparatus for testing solid and opaque objects as to their internal structures, flaws, defects and the like;

Figure 10 is a vertical sectional view through an apparatus for testing for sound propagation in hollow miniature models and the like;

Figure 4:
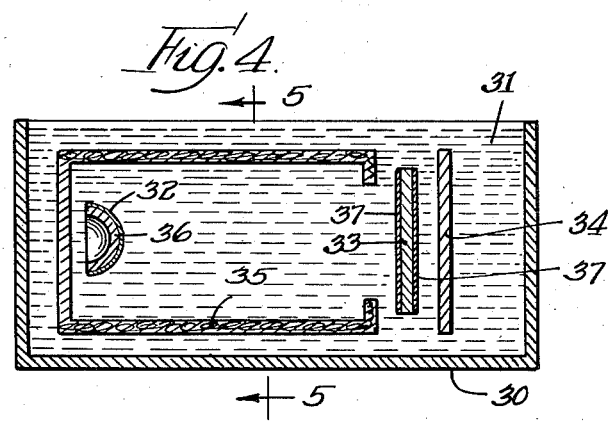

Referring first to the apparatus for Figure 1 for testing an ultrasonic transmitter as to its beam pattern, it includes a container 10 which is lined with absorbing material 11 such as felt or the like. The container 10 is filled with a liquid 12 such as kerosene or the like. An ultrasonic beam transmitter whose beam is to be tested is indicated at 13, and it is immersed in the liquid 12 in the container 10. The ultrasonic beam transmitter may be provided with various beam concentrating or spreading devices or reflectors as indicated at 14. The ultrasonic beam transmitter with its reflectors may be of any desired type, and for purposes of illustration here it is of a type to produce a wide beam pattern. Here the transmitter may be in the form of a cylinder. Also immersed in the liquid 12 is a phosphorescent screen 15, which may be of any desired thickness. Preferably for this application, the phosphorescent screen 15 is curved with its radius of curvature being at the transmitter 13. The phosphorescent screen 15 may be constructed in the manner pointed out above.

In practicing the method of ascertaining the ultrasonic beam pattern with the apparatus illustrated in Figure 1, the ultrasonic transmitter 13, with or without its reflectors or the like 14, is immersed in the liquid 12 of the container 10. The phosphorescent screen 15 is excited and also immersed in the liquid 12. The ultrasonic transmitter 13 is then energized, and the excited phosphorescent screen 15 is then subjected to the transmitted ultrasonic beam in the absence of exciting energy for a desired time interval. The ultrasonic beam transmitted through the liquid strikes the excited phosphorescent screen 15, and modifies the rate of decay of the phosphorescence of the screen to form a pattern thereon in accordance with the pattern of the transmitted beam. After being subjected to the ultrasonic beam for a sufficient time interval, the phosphorescent screen 15 may then be withdrawn from the container 10 and inspected for the purpose of ascertaining the ultrasonic beam pattern produced thereon. To obtain a permanent record of the ultrasonic beam pattern the phosphorescent screen 15 may be applied to a photographic emulsion for photographically reproducing the beam pattern thereon. The absorbing material 11 absorbs waves produced by the ultrasonic transmitter and not directly transmitted to the screen. This prevents interference from stray waves and also prevents the formation of standing waves, which would interfere with the reproduction of the beam pattern.

The phosphorescent screen 15 may be excited by an ultraviolet lamp or a strong tungsten lamp. The phosphorescent screen after being excited is preferably immersed in the liquid 12 in total darkness, this operation being made easy by the light produced by the phosphorescent screen. If desired, immersion of the screen into the liquid in the proper place may be made with the help of red or yellow red light since the phosphorescent screen is not sensitive to such light. The ultrasonic transmitter 13 is energized for a time depending upon the intensity provided at the distance where the phosphorescent screen is located. Excellent results have been obtained by using a one minute time interval with average intensities of .1 to one watt/cm.² After irradiation for the desired time interval the ultrasonic transmitter is turned off, and the phosphorescent screen removed from the liquid. If the phosphorescent screen 15 is made out of plastic material, it may be flattened on a photographic emulsion. Excellent results have been obtained by using an exposure time of about twenty seconds on Kodak Panatomic X film.

Figures 2 and 3 illustrate a somewhat different form of apparatus for determining the intensity pattern in narrow supersonic beams. Here an elongated container having a bottom wall and side walls 21 is utilized. One end wall 22 is made of light transparent material such as glass. The container is filled with liquid 23. An ultrasonic transmitter 24 which produces narrow ultrasonic beams is immersed in the liquid 23. A thin phosphorescent screen 25 is also immersed in the liquid 23. This phosphorescent screen may be constructed in the manner described above. It is preferably made flat and very thin, for example, a phosphorescent plastic sheet 0.12 mm. thick. The ultrasonic beam is only absorbed in part in this screen, and to avoid the building up of standing waves, a glass oblique reflector 26 located behind the screen sends the remaining part of the ultrasonic beam in an upward direction. Absorbing material 27 is placed about the transmitter, phosphorescent screen and the reflector to absorb unwanted waves and to prevent the building up of standing waves. The waves passing through the phosphorescent screen 25 and directed upwardly by the reflector 26 are absorbed by the absorbing material 27. Since the end wall 22 and the reflector 26 are made of light transmitting materials such as glass, the condition of the phosphorescent screen 25 may be observed through the end wall 22.

The method of obtaining, or ascertaining, the ultrasonic beam pattern in the apparatus of Figures 2 and 3 is substantially the same as that utilizing the apparatus of Figure 1. The phosphorescent screen 25 is excited, preferably with light, and immersed in the liquid 23. The ultrasonic beam transmitter 24 is energized and phosphorescent screen 25 is subjected to the action of the beam. Since the phosphorescent screen 25 is very thin, the effect of the ultrasonic beam thereon extends through the screen and is observed through the transparent end wall 22 of the container. Thus, it is not necessary to remove the screen from the container for inspection purposes. Here, as in the preceding arrangement, the beam pattern produced on the phosphorescent screen 25 may be photographically reproduced. If desired, light excitation of the phosphorescent screen 25 may be accomplished through the glass end wall 22 and the glass reflector 26, but usually better results are obtained by exciting the phosphorescent screen 25 before it is immersed in the liquid 23.

Figure 5:
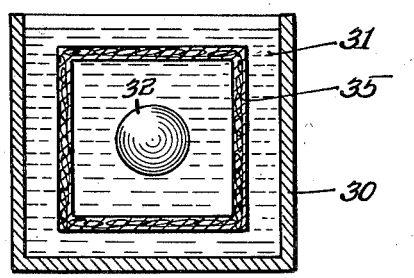
Figure 5 is a vertical sectional view taken substantially along the line 5—5 of Figure 4.

In Figures 4 and 5 there is illustrated an apparatus for testing solid and opaque objects as to their internal structures, flaws, defects and the like. Here, a container 30 is filled with a suitable liquid 31. An ultrasonic transmitter 32 having known beam pattern characteristics is immersed in the liquid 31. The solid and opaque object 33 is also immersed in the liquid between the transmitter 32 and a phosphorescent screen 34. Suitable absorbing material 35 is located within the container 30 for absorbing unwanted waves, and to prevent building up of standing waves. The ultrasonic transmitter 32 and the object to be tested 33 may be provided with suitable matching devices 36 and 37, respectively, for increasing the efficiency of transmission of the ultrasonic beams through the liquid and the object to be tested through the phosphorescent screen 34. These matching devices 36 and 37 may be made of suitable layers of suitable materials of suitable thickness for increasing the coupling efficiency. The phosphorescent screen 34 may be made in the manner described above.

After the ultrasonic transmitter 32 and the object to be tested 33 are immersed in the liquid 31, the phosphorescent screen 34 is excited and immersed in the liquid, the transmitter, object and phosphorescent screen being located in desired positions as illustrated. The transmitter 32 is then energized to direct an ultrasonic beam through the liquid and through the object being tested onto the phosphorescent screen 34. If the ultrasonic beam has been locally modified by the internal structure, flaw or defect of the object 33 as it passes therethrough, this appears on the phosphorescent screen 34 as a spot or area of different brightness compared to the surroundings. In this way the internal structure, flaw, defect or the like in the object 33 being tested are accurately and simply depicted on the phosphorescent screen 34. The phosphorescent screen 34 may be withdrawn from the liquid 31 after irradiation and inspected and also it may be photographically reproduced in the manner discussed above.

Figure 6:
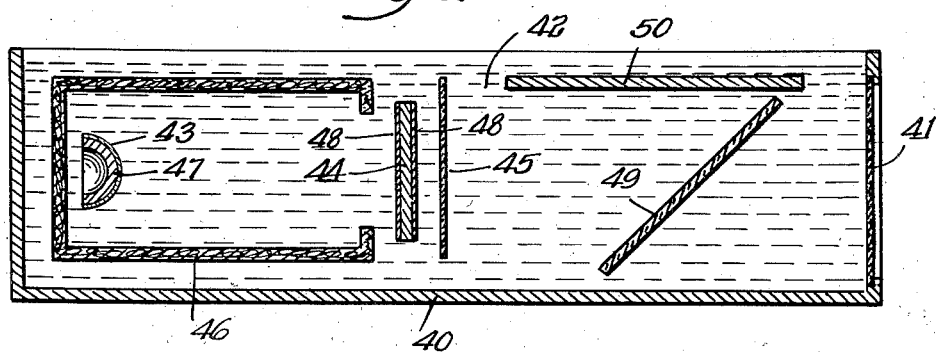

The arrangement Figure 6 is very much like that of Figures 4 and 5 for testing solid and opaque objects as to their internal structures, flaws, defects and the like. Here, a container 40 having a transparent end wall 41 is filled with a liquid 42. An ultrasonic beam transmitter 43 is immersed in the liquid as well as the object 44 to be tested. A very thin phosphorescent screen 45 is also immersed in the liquid. Suitable absorbing material 46 is contained within the container 40 for absorbing unwanted waves. The transmitter 43 and the object being tested 44 may be provided with matching devices 47 and 48, respectively. Since the phosphorescent screen 45 is very thin, a transparent baffle 49 directs waves passing through this screen upwardly into absorbing material 50 to prevent the building up of standing waves. The manner of testing in the apparatus of Figure 6 is very much like that in the apparatus of Figures 4 and 5, and, therefore, further description is not considered necessary. Here, however, the irradiation of the phosphorescent screen 45 may be inspected through the glass end wall 41 and the glass baffle 49, much the same as in the arrangement of Figures 2 and 3.

Figure 7:
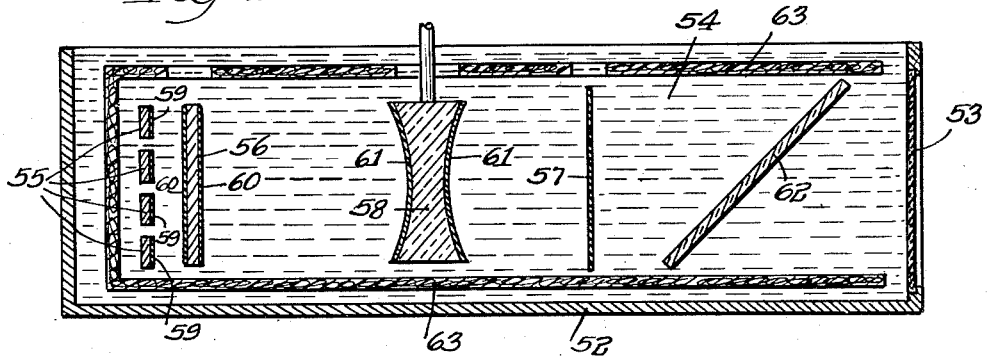

Figure 7 illustrates a further form of apparatus for testing solid and opaque objects as to their internal structures, flaws, defects and the like. Here, a container 52 having a transparent end wall 53 is filled with a liquid 54. An ultrasonic transmitter, which may take the form of a plurality of small transmitters 55, produces an ultrasonic beam having a known pattern. The object to be tested 56 is located adjacent the ultrasonic transmitter 55. A thin phosphorescent screen 57 is also immersed in the liquid 54 along with the object being tested 56 and the ultrasonic transmitter 55. Immersed in the liquid 54 between the phosphorescent screen 57 and the object being tested 56 is an ultrasonic lens 58. The ultrasonic transmitter 55, the object being tested 56 and the ultrasonic lens 58 may be provided with matching devices 59, 60 and 61, respectively, for increasing the ultrasonic transmission efficiency. An oblique transparent reflector 62 is immersed in the liquid and operates to direct upwardly the ultrasonic beam passing through the phosphorescent screen 57 into absorbing material 63. The absorbing material 63 as hereinbefore described absorbs unwanted waves and prevents the building up of standing waves. The irradiation of the phosphorescent screen 57 may be inspected through the transparent end wall 53 and the transparent reflector 62.

When the phosphorescent screen 57 is excited and immersed in the liquid 54 and the ultrasonic transmitter 55 is energized, the ultrasonic beam passing through the object 56 being tested is focused by the ultrasonic lens 58 onto the phosphorescent screen 57. In this arrangement the image of the internal structure, flaw or defect of the object being tested is focused on the phosphorescent screen. The object being tested, the ultrasonic lens and the phosphorescent screen may be relatively positioned to focus the image of a selected depth of the object being tested on the phosphorescent screen. In this way the internal structure, flaw or defect at any selected depth in the object being tested may be ascertained. By making graduated focusing adjustments the object may be tested at various points throughout its depth to obtain a three dimensional determination of the object's internal structures, flaws, defects and the like.

Figure 8:
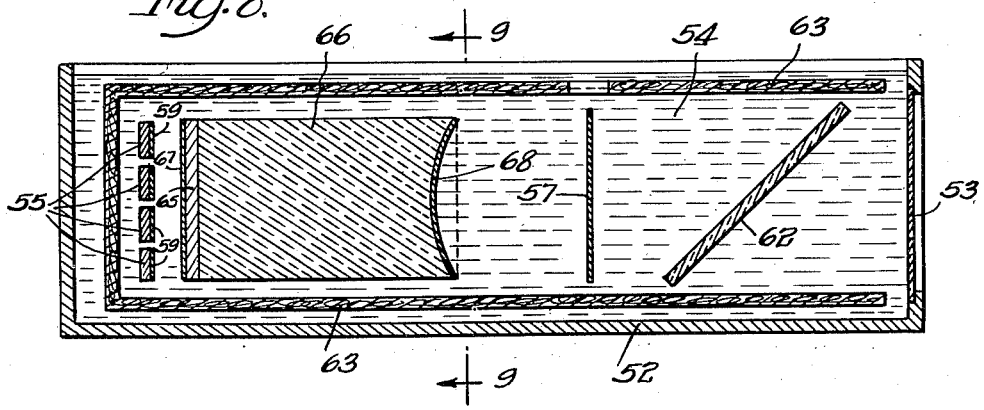
Figure 9:
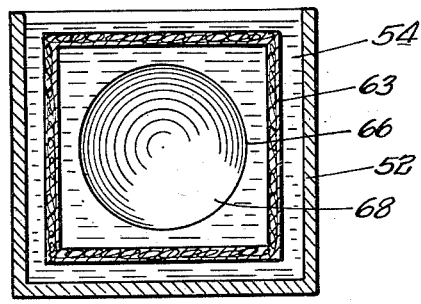
Figure 9 is a vertical sectional view taken substantially along the line 9—9 of Figure 8.

The apparatus of Figures 8 and 9 is also utilized for testing solid and opaque objects as to their internal structures, flaws, defects and the like, and the construction thereof is very much like that illustrated in Figure 7, like reference characters being utilized for like parts. The arrangement of Figures 8 and 9 is particularly adaptable for testing solid and opaque objects which are flat. Here, the object to be tested is designated at 65, and it is arranged against the end of a thick or elongated metal ultrasonic lens 66. Thus, the ultrasonic beam passes directly from the object being tested 65 to the ultrasonic lens 66 making the transmission of power from the ultrasonic transmitter to the phosphorescent screen more efficient. Further to increase the efficiency of power transmission one side of the object being tested and one side of the ultrasonic lens 66 are provided with matching devices 67 and 68, respectively. This thick or elongated ultrasonic lens 66 may be made from a block of aluminum or the like. Of course, the thick ultrasonic lens must be as free as possible from all internal defects or flaws for such would be depicted on the phosphorescent screen 57. The arrangement of Figures 8 and 9 operates very much like that of Figure 7 with the exception that the testing as to various depths is provided by moving the phosphorescent screen and the transmission of power is somewhat increased.

Figure 10:
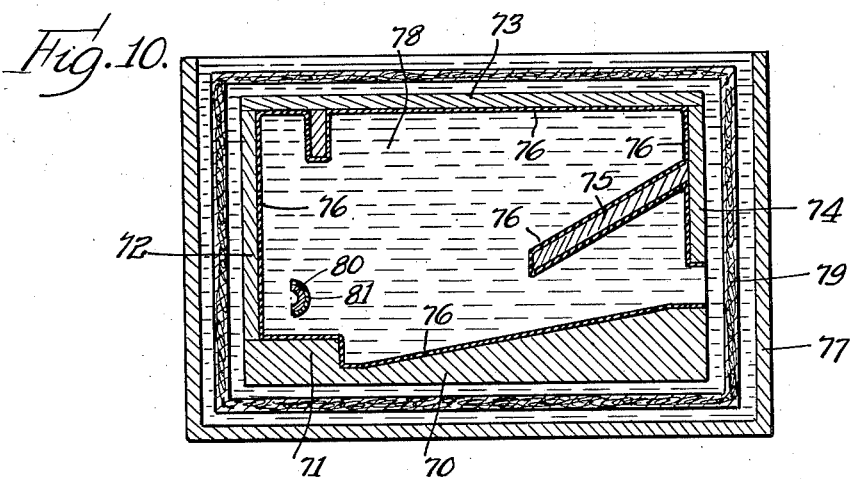

Figure 10 illustrates a manner of testing for sound propagation in hollow miniature models and the like. Here, a container 77 is filled with a liquid 78 and is provided with sound absorbing material 79. The miniature model to be tested is immersed in the liquid. For purposes of illustration here the miniature model is a counterpart of an auditorium or the like. It is constructed in a separable fashion and has a floor portion 70 with a stage portion 71. It also has a front wall 72, a ceiling wall 73 and a rear wall 74 as well as side walls. The rear wall 74 may be provided with a balcony section 75. In testing the model it is disassembled and the inner surfaces of the model are coated with a phosphorescent material. Here, the microcrystalline phosphorescent material may be mixed in a suitable carrier having a solvent and applied to the inner surfaces and then dried to drive off the solvent. This phosphorescent coating is designated at 76. In this way the inner surfaces of the model are in effect provided with a phosphorescent screen.

The phosphorescent coating 76 is then excited and the model is assembled and immersed in the liquid 78, the liquid completely filling the model. An ultrasonic transmitter 80 having a matching device 81 is immersed in the liquid at a desired position within the model, as for example, at the stage portion 71. When the ultrasonic transmitter is energized, a pattern is produced on the phosphorescent coating of the model in accordance with propagation of the ultrasonic beam and acts in accordance with the sound propagation in the model. After the coating 76 has been irradiated, the model may be removed from the liquid and disassembled. The pattern produced on the coating by the irradiation provides an indication of the sound propagation in the model. In so testing the miniature model, actual sound conditions at the walls or surfaces in a full scale counterpart of the model may be accurately predetermined.

Figure 11:
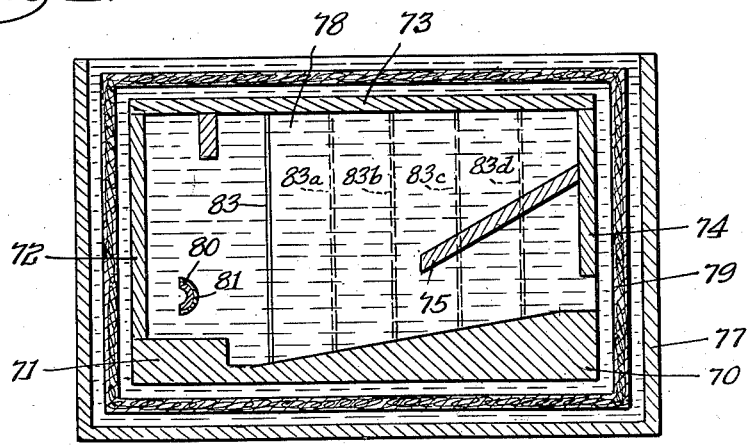
Figure 11 is a vertical sectional view through an apparatus for testing for sound propagation in hollow miniature models and the like wherein the sound propagation in space is tested.

Figure 11 illustrates an apparatus for determining sound propagation in space within a miniature model, and, hence, in a full size counterpart thereof. The apparatus of Figure 11 is very much like that of Figure 10 and like reference characters have been utilized for like parts. Here, very thin phosphorescent screen 83 which is substantially transparent to ultrasonic beams or waves is immersed in the liquid at desired positions within the miniature model, and is subjected to the ultrasonic beam transmitted through the liquid by the ultrasonic transmitter 80. The pattern produced on the phosphorescent screen 83 corresponds to the propagation of the ultrasonic beam in space within the model, and, hence, to the sound propagation expected in the full size counterpart of the model. The phosphorescent screen 83 may be located at various points within the model, as illustrated at 83A, 83B, 83C or 83D for determining the sound propagation in space at any of these points.

While for purposes of illustration several arrangements of this invention have been disclosed, other arrangements thereof may become apparent to those skilled in the art and accordingly this invention is to be limited only by the scope of the appended claims.

I claim as my invention:

1. The method of ascertaining an ultrasonic beam pattern comprising the steps of, immersing an ultrasonic transmitter in a liquid, exciting and immersing in the liquid a long decay time phosphorescent screen at a desired position with respect to the ultrasonic transmitter while the transmitter is turned off, then energizing the immersed ultrasonic transmitter while the screen is not otherwise being excited and subjecting the immersed excited phosphorescent screen in the absence of exciting energy and for a time interval to the beam transmitted through the liquid by the ultrasonic transmitter to modify the rate of decay of the phosphorescence of the screen to form a visual pattern thereon in accordance with the pattern of the transmitted beam.

2. The method of recording an ultrasonic beam pattern comprising the steps of, immersing an ultrasonic transmitter in a liquid, first exciting a long decay time phosphorescent screen outside of the liquid and then removing the screen from the excitation source and then immersing the screen in the liquid at a desired position with respect to the ultrasonic transmitter while the transmitter is turned off, then energizing the immersed ultrasonic transmitter and subjecting the immersed still glowing phosphorescent screen in the absence of other exciting energy and for a time interval to the beam transmitted through the liquid by the ultrasonic transmitter to modify the rate of decay of the phosphorescence of the screen to form a visual pattern thereon in accordance with the pattern of the transmitted beam, then removing the phosphorescent screen from the liquid, and applying the phosphorescent screen to a photographic emulsion for reproducing the beam pattern thereon.

3. The method of ascertaining an ultrasonic beam pattern comprising the steps of, immersing an ultrasonic transmitter in a liquid, exciting and immersing in the liquid a long decay time phosphorescent screen at a desired position with respect to the ultrasonic transmitter while the transmitter is turned off, then energizing the immersed ultrasonic transmitter while the screen is not otherwise being excited and subjecting the immersed excited phosphorescent screen in the absence of exciting energy and for a time interval to the beam transmitted through the liquid by the ultrasonic transmitter to modify the rate of decay of the phosphorescence of the screen to form a visual pattern thereon in accordance with the pattern of the transmitted beam, and absorbing the waves produced by the ultrasonic transmitter and not directly transmitted to the phosphorescent screen.

4. The method of recording an ultrasonic beam pattern comprising the steps of, immersing an ultrasonic transmitter in a liquid, first exciting a long decay time phosphorescent screen outside of the liquid and then removing the screen from the excitation source and then immersing the screen in the liquid at a desired position with respect to the ultrasonic transmitter, while the transmitter is turned off, then energizing the immersed ultrasonic transmitter and subjecting the immersed still glowing phosphorescent screen in the absence of other external exciting energy and for a time interval to the beam transmitted through the liquid by the ultrasonic transmitter to modify the rate of decay of the phosphorescence of the screen to form a visual pattern thereon in accordance with the pattern of the transmitted beam, absorbing the waves produced by the ultrasonic transmitter and not directly transmitted to the phosphorescent screen, then removing the phosphorescent screen from the liquid, and applying the phosphorescent screen to a photographic emulsion for reproducing the beam pattern thereon.

5. An apparatus for ascertaining an ultrasonic beam pattern comprising, a container, a liquid in the container, an ultrasonic transmitter immersed in the liquid, a preexcited, long decay time phosphorescent screen immersed in the liquid at a point spaced from the ultrasonic transmitter and being free of excitation sources other than said transmitter, the ultrasonic beam transmitted by the ultrasonic transmitter through the liquid increasing the decay rate of phosphorescence of the screen to form a visual pattern thereon in accordance with the pattern of the transmitted beam.

6. An apparatus for ascertaining an ultrasonic beam pattern comprising, a container, a liquid in the container, an ultrasonic transmitter immersed in the liquid, a preexcited long decay time phosphorescent screen immersed in the liquid at a point spaced from the ultrasonic transmitter and being free of excitation sources other than said transmitter, the ultrasonic beam transmitted by the ultrasonic transmitter through the liquid modifying the decay rate of the phosphorescence of the screen to form a visual pattern thereon in accordance with the pattern of the transmitted beam, and absorbing material in the container about the ultrasonic transmitter and phosphorescent screen for absorbing waves produced by the transmitter and not directly transmitted to the screen.

7. An apparatus for ascertaining an ultrasonic beam pattern comprising, a container having a transparent wall at one end, a transparent baffle obliquely arranged in the container adjacent said one end, a liquid in the container, an ultrasonic transmitter immersed in the liquid adjacent the other end of the container, a thin excited phosphorescent screen immersed in the liquid between the ultrasonic transmitter and the transparent baffle, the ultrasonic beam transmitted by the ultrasonic transmitter through the liquid modifying the decay rate of the phosphorescence of the screen to form a visual pattern thereon in accordance with the pattern of the transmitted beam and the pattern on the screen being visible through the transparent baffle and end wall, and absorbing material in the container adjacent all of the sides thereof except the transparent end wall for absorbing waves produced by the transmitter and not directly transmitted to the screen.

8. The method of testing an ultrasonic transmitter by ascertaining the ultrasonic beam pattern thereof comprising the steps of, immersing the ultrasonic transmitter to be tested in a liquid, first externally exciting a long decay time phosphorescent screen and then removing the screen from the excitation source and then immersing the screen in the liquid at a desired position with respect to the ultrasonic transmitter while the transmitter is turned off, then energizing the immersed ultrasonic transmitter and subjecting the immersed still glowing phosphorescent screen in the absence of other exciting energy and for a time interval to the beam transmitted through the liquid by the ultrasonic transmitter to modify the rate of decay of the phosphorescence of the screen to form a visual pattern thereon in accordance with the pattern of the transmitted beam.

9. The method of testing solid and opaque objects as to their internal structures, flaws, defects and the like comprising the steps of, immersing in a liquid an ultrasonic transmitter capable of transmitting an ultrasonic beam, immersing in the liquid an object to be tested in the path of the ultrasonic beam, exciting and immersing in the liquid while the transmitter is turned off a long decay time phosphorescent screen on the side of the object to be tested opposite to the ultrasonic transmitter and in the path of the ultrasonic beam to be passed through the object to be tested, then energizing the immersed ultrasonic transmitter to transmit an ultrasonic beam through the liquid and the object to be tested while the screen is not otherwise being excited, subjecting the immersed excited phosphorescent screen in the absence of exciting energy and for a time interval to the beam transmitted through the liquid and the object being tested by the ultrasonic transmitter to modify the rate of decay of the phosphorescence of the screen to form a visual pattern thereon in accordance with the internal structure, flaws, defects, or the like of the object being tested.

10. The method of testing solid and opaque objects as to their internal structures, flaws, defects and the like comprising the steps of, immersing in a liquid an ultrasonic transmitter capable of transmitting an ultrasonic beam, immersing in the liquid an object to be tested in the path of the ultrasonic beam, exciting and immersing in the liquid while the transmitter is turned off a long decay time phosphorescent screen on the side of the object to be tested opposite to the ultrasonic transmitter and in the path of the ultrasonic beam to be passed through the object to be tested, immersing an ultrasonic lens in the liquid between the object to be tested and the phosphorescent screen and in the path of the ultrasonic beam to be passed through the object to be tested, then while the screen is not otherwise being excited energizing the immersed ultrasonic transmitter to transmit an ultrasonic beam through the liquid, the object to be tested and the ultrasonic lens, subjecting the immersed excited phosphorescent screen in the absence of exciting energy and for a time interval to the beam transmitted through the liquid, the object being tested and the ultrasonic lens by the ultrasonic transmitter to modify the rate of decay of the phosphorescence of the screen to form a visual pattern thereon in accordance with the internal structure, flaws, defects, or the like of the object being tested.

11. The method of testing in depth solid and opaque objects as to their internal structures, flaws, defects and the like comprising the steps of, immersing in a liquid an ultrasonic transmitter capable of transmitting an ultrasonic beam, immersing in the liquid an object to be tested in the path of the ultrasonic beam, immersing an ultrasonic lens in the liquid on the side of the object to be tested opposite to the ultrasonic transmitter and in the path of the ultrasonic beam passing through the object to be tested, exciting and immersing in the liquid a long decay time phosphorescent screen on the side of the ultrasonic lens opposite to the object to be tested and in the path of the ultrasonic beam to be passed through the object to be tested and the ultrasonic lens while the transmitter is turned off, relatively positioning the object to be tested, the ultrasonic lens and the excited phosphorescent screen to focus the image of a selected depth of the object to be tested on the excited phosphorescent screen, then energizing the immersed ultrasonic transmitter to transmit an ultrasonic beam through the liquid, the object to be tested and the ultrasonic lens and to subject the immersed excited phosphorescent screen in the absence of exciting energy and for a time interval to the beam transmitted through the liquid, the object being tested and the ultrasonic lens by the ultrasonic transmitter to modify the rate of decay of the phosphorescence of the screen to form a visual pattern thereon in accordance with the image of the internal structure, flaws, defects or the like at the selected depth of the object being tested.

12. The method of testing in depth solid and opaque objects as to their internal structures, flaws, defects and the like comprising the steps of, immersing in a liquid an ultrasonic transmitter capable of transmitting an ultrasonic beam, immersing in the liquid an object to be tested in the path of the ultrasonic beam, immersing an ultrasonic lens in the liquid on the side of the object to be tested opposite to the ultrasonic transmitter and in the path of the ultrasonic beam passing through the object to be tested, exciting and immersing in the liquid a phosphorescent screen on the side of the ultrasonic lens opposite to the object to be tested and in the path of the ultrasonic beam to be passed through the object to be tested and the ultrasonic lens, relatively positioning the object to be tested, the ultrasonic lens and the excited phosphorescent screen to focus the image of a selected depth of the object to be tested on the excited phosphorescent screen, energizing the immersed ultrasonic transmitter to transmit an ultrasonic beam through the liquid, the object to be tested and the ultrasonic lens, subjecting the immersed excited phosphorescent sceen in the absence of exciting energy and for a time interval to the beam transmitted through the liquid, the object being tested and the ultrasonic lens by the ultrasonic transmitter for modifying the rate of decay of the phosphorescence of the screen to form a visual pattern thereon in accordance with the image of the internal structure, flaws, defects or the like at the selected depth of the object being tested, and repeating the foregoing steps with different relative positions of the object to be tested, the ultrasonic lens and the excited phosphorescent screen wherein images of different selected depths of the object being tested are focused on the excited phosphorescent screen.

13. The method of testing flat, solid and opaque objects as to their internal structures, flaws, defects and the like comprising the steps of, immersing in a liquid an ultrasonic transmitter capable of transmitting an ultrasonic beam, placing a flat side of an object to be tested against one face of a thick metallic ultrasonic lens, immersing in the liquid the object to be tested and the ultrasonic lens with the object to be tested facing the ultrasonic transmitter and in the path of the ultrasonic beam, exciting and immersing in the liquid while the transmitter is turned off a long decay time phosphorescent screen so as to face the ultrasonic lens to and be in the path of the ultrasonic beam, energizing the immersed ultrasonic transmitter to transmit an ultrasonic beam through the liquid, the object to be tested and the ultrasonic lens, subjecting the immersed excited phosphorescent screen in the absence of other exciting energy on the screen and for a time interval to the beam transmitted through the liquid, the object being tested and the ultrasonic lens by the ultrasonic transmitter to modify the rate of decay of the phosphorescence of the screen to form a visual pattern thereon in accordance with the internal structure, flaws, defects, or the like of the object being tested.

14. The method of testing for sound propagation in hollow miniature models and the like comprising the steps of, coating the inner surfaces of a miniature model to be tested with a long decay time phosphorescent material, exciting the phosphorescent coating and immersing the miniature model to be tested in a liquid with the liquid completely filling the same, immersing an ultrasonic transmitter in the liquid at a desired position within the miniature model to be tested, energizing the immersed ultrasonic transmitter to transmit an ultrasonic beam through the liquid and subjecting the excited phosphorescent coating of the miniature model being tested in the absence of other exciting energy thereon and for a time interval to the ultrasonic beam transmitted through the liquid by the ultrasonic transmitter to modify the rate of decay of the phosphorescence of the coating to form a visual pattern on the phosphorescent coating in accordance with the propagation of the ultrasonic beam and hence the sound propagation in the miniaure model being tested.

15. The method of testing for sound propagation in hollow miniature models and the like comprising the steps of, immersing a miniature model to be tested in a liquid with the liquid completely filling the same, immersing an ultrasonic transmitter in the liquid at a desired position within the miniature model to be tested, exciting and immersing in the liquid at a desired position within the miniature model to be tested a long decay time thin and ultrasonic beam transparent phosphorescent screen while the transmitter is turned off, then energizing the immersed ultrasonic beam transmitter and subjecting the immersed phosphorescent screen in the absence of other exciting energy and for a time interval to the ultrasonic beam transmitted through the liquid by the ultrasonic transmitter to modify the rate of decay of the phosphorescence of the screen to form a visual pattern thereon in accordance with the propagation of the ultrasonic beam passing therethrough and hence the sound propagation in the miniature model being tested.

References Cited in the file of this patent

UNITED STATES PATENTS

| | | |
|---|---|---|
| 2,505,867 | Meunier | May 2, 1950 |
| 2,525,873 | De Lano | Oct. 17, 1950 |
| 2,546,160 | Lengyel | Mar. 27, 1951 |
| 2,642,538 | Urbach | June 16, 1953 |

FOREIGN PATENTS

| | | |
|---|---|---|
| 48,400 | Netherlands | May 15, 1940 |